(12) United States Patent
Birnbaum et al.

(10) Patent No.: US 8,531,485 B2
(45) Date of Patent: Sep. 10, 2013

(54) SYSTEMS AND METHODS FOR COMPENSATING FOR VISUAL DISTORTION CAUSED BY SURFACE FEATURES ON A DISPLAY

(75) Inventors: David Birnbaum, Oakland, CA (US); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 986 days.

(21) Appl. No.: 12/608,875

(22) Filed: Oct. 29, 2009

(65) Prior Publication Data

US 2011/0102462 A1 May 5, 2011

(51) Int. Cl.
*G09G 5/00* (2006.01)

(52) U.S. Cl.
USPC .......................................... 345/647

(58) Field of Classification Search
USPC .......................................... 345/647
See application file for complete search history.

(56) References Cited

U.S. PATENT DOCUMENTS

| | | | |
|---|---|---|---|
| 5,971,270 A * | 10/1999 | Barna | 235/375 |
| 2002/0024640 A1* | 2/2002 | Ioka | 353/94 |
| 2004/0135744 A1* | 7/2004 | Bimber et al. | 345/32 |
| 2005/0099403 A1* | 5/2005 | Kraus et al. | 345/173 |
| 2006/0007189 A1* | 1/2006 | Gaines et al. | 345/179 |
| 2007/0220427 A1 | 9/2007 | Briancon et al. | |
| 2008/0121442 A1 | 5/2008 | den Boer et al. | |
| 2008/0303796 A1 | 12/2008 | Fyke | |
| 2011/0050587 A1 | 3/2011 | Natanzon et al. | |

* cited by examiner

*Primary Examiner* — Jeffery A Brier
(74) *Attorney, Agent, or Firm* — Kilpatrick Townsend & Stockton LLP (57) ABSTRACT

Systems and methods for compensating for visual distortion caused by surface features on a display are disclosed. For example, one disclosed system includes: a display including one ore more surface features; a processor configured to: receive a display signal including graphical data; determine a location of the surface feature; transform the display signal based at least in part on the location of the surface feature; and cause the transformed display signal to be displayed.

12 Claims, 6 Drawing Sheets

SYSTEMS AND METHODS FOR COMPENSATING FOR VISUAL DISTORTION CAUSED BY SURFACE FEATURES ON A DISPLAY

FIELD OF THE INVENTION

The present invention generally relates to display systems, and more particularly to systems and methods for compensating for visual distortion caused by surface features on a display.

BACKGROUND

The use of touch-screens in all types of devices is becoming more common. Conventional touch-screens have a flat surface. But many touch-screens can benefit from the tactile haptic feedback caused by the addition of surface features. These surface features can lead to distortion of the image on the display. Thus, there is a need for systems and methods for compensating for visual distortion caused by surface features on a display.

SUMMARY

Embodiments of the present invention provide systems and methods for compensating for visual distortion caused by surface features on a display. For example, one embodiment discloses a system comprising: a display comprising one or more surface features; a processor configured to: receive a display signal comprising graphical data; determine a location of the surface feature; transform the display signal based at least in part on the location of the surface feature; and cause the transformed display signal to be displayed.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying figures, wherein.

DETAILED DESCRIPTION

Embodiments of the present invention provide systems and methods for compensating for visual distortion caused by surface features on a display.

Illustrative Embodiment of Compensating for Distortion Caused by Surface Features on a Display One illustrative embodiment of the present invention comprises a mobile device such as a mobile phone. The mobile device comprises a housing, which contains a touch-screen display. The mobile device also comprises a processor and memory. The processor is in communication with both the memory and the touch-screen display. To provide active haptic feedback, the illustrative mobile device comprises an actuator, which is in communication with the processor. The actuator is configured to receive a haptic signal from the processor, and in response, output a haptic effect. In the illustrative embodiment, as the user interacts with the mobile device, the processor generates the appropriate haptic signal and transmits the signal to the actuator. The actuator then produces the appropriate haptic effect.

In the illustrative embodiment, the touch-screen display is configured to receive signals from the processor and display a graphical user interface. The touch-screen of the illustrative device also comprises surface features, which provide tactile feedback. In one embodiment, the touch-screen may comprise permanent or static surface features, for example, grooves cut into the surface of the touch screen. In other embodiments the user may place a removable skin comprising static surface features over the surface of the touch-screen. In still other embodiments, the user may have dropped the mobile device, leading to surface features in the form of scratches. In still other embodiments, the display may be made out of a deformable or "smart" material that can change surface features according to the function of the device or the needs of the user.

In the illustrative embodiment, static surface features are formed by raised or lowered sections of the touch-screen. These raised or lowered sections form ridges and troughs, which the user will feel when interacting with the touch-screen. In some embodiments, these ridges and troughs may form a pattern that the user recognizes. For example, in the illustrative device, the touch-screen comprises surface features that form the letters and numbers of a QWERTY keyboard. In some embodiments, the graphical user interface displayed by the touch-screen comprises a keyboard corresponding to the surface features on the surface of the touch-screen. For example, the surface features on a touch-screen display may form a QWERTY keyboard, while a corresponding virtual QWERTY keyboard is shown on the display. In other embodiments, the image shown on the display does not correspond to the surface features. For example, the surface features may form a QWERTY keyboard, while the display shows a user defined background image. In some embodiments these troughs and ridges are permanently applied to the surface of the touch-screen. In other embodiments, a skin comprising the surface features is placed overtop of the touch-screen.

In the illustrative embodiment, the touch-screen may further comprise dynamic surface features. In such an embodiment, a processor controls the shape, depth, height, or other characteristics of the dynamic surface features. In some embodiments, dynamic surface features may be implemented by a haptic substrate placed underneath a flexible display. In such an embodiment the haptic substrate may flex upward or downward, forming dynamic ridges or troughs in the surface of the flexible display.

The surface features may distort the image output by the display. Thus, there is a need for systems and methods for compensating for visual distortion caused by surface features on a display. In the illustrative embodiment, the processor determines a location of the surface features. For example, the processor may receive a sensor signal from a sensor configured to detect the location of the surface features. In another embodiment, the processor may access a data store to determine the location of surface features. In another embodiment, the processor may control dynamic surface features, and thus have already stored the coordinates of the surface features. The processor also receives a display signal, and transforms the display signal based at least in part on the location of the surface features. For example, the processor may transform the display signal by modifying the brightness, hue, contrast, resolution, saturation, sharpness, or image warping of the signal. The processor may transform the entire display signal, or transform only the portions of the display signal that correspond to the locations of the surface features. Finally, the processor causes the transformed display signal to be displayed. The transformation compensates for the distortion caused by the surface features. Thus, when the transformed display signal is output, the distortion is less visible to the user.

This illustrative example is given to introduce the reader to the general subject matter discussed herein. The invention is not limited to this example. The following sections describe various additional embodiments and examples of methods and systems for compensating for the distortion caused by surface features on a display.

Figure 1:
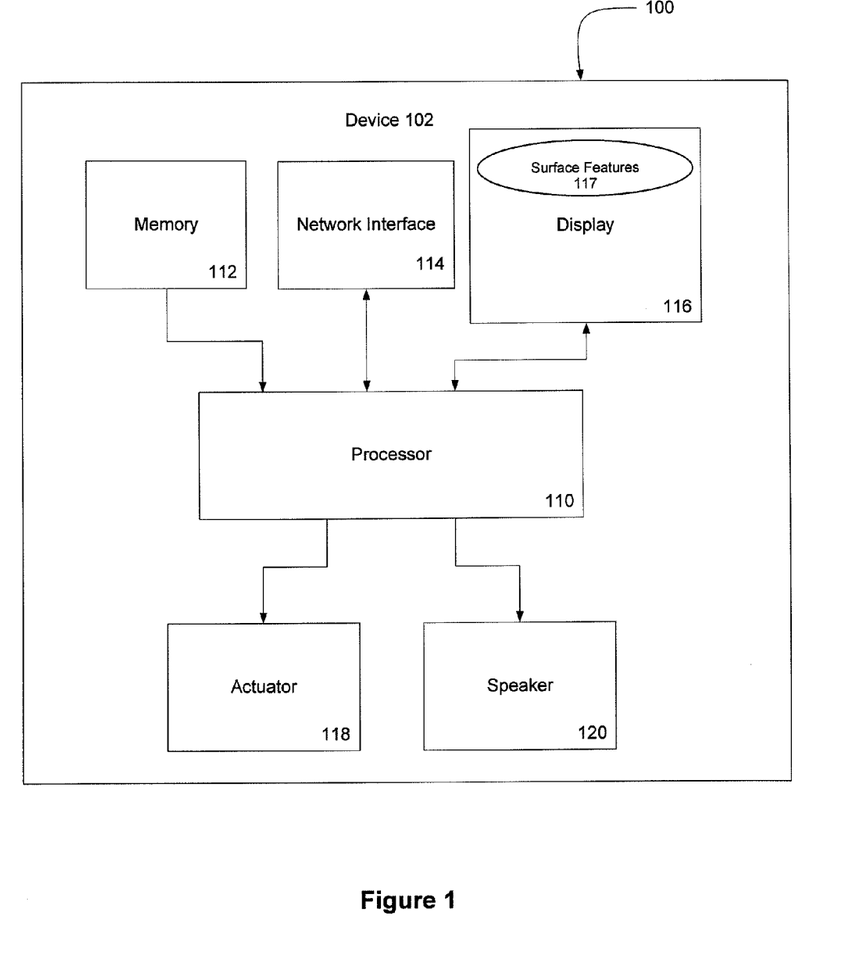
FIG. 1 is a block diagram of a system for compensating for visual distortion caused by surface features on display according to one embodiment of the present invention.

Illustrative Systems for Compensating for Distortion Caused by Surface Features on a Display Referring now to the drawings in which like numerals indicate like elements throughout the several Figures, FIG. 1 is a block diagram of a system for compensating for visual distortion caused by surface features on a display according to one embodiment of the present invention. As shown in FIG. 1, the system 100 comprises a mobile device 102, such as a mobile phone, portable digital assistant (PDA), portable media player, or portable gaming device. The mobile device 102 comprises a processor 110. The processor 110 includes or is in communication with one or more computer-readable media, such as memory 112, which may comprise random access memory (RAM). Processor 110 is also in communication with a network interface 114, a display 116 comprising surface features 117, an actuator 118, and a speaker 120. The processor 110 is configured to generate a graphical user interface, which is displayed to the user via display 116.

Embodiments of the present invention can be implemented in combination with, or may comprise combinations of, digital electronic circuitry, computer hardware, firmware, and software. The mobile device 102 shown in FIG. 1 comprises a processor 110, which receives input signals and generates signals for communication, display, and providing haptic feedback. The processor 110 also includes or is in communication with one or more computer-readable media, such as memory 112, which may comprise random access memory (RAM).

The processor 110 is configured to execute computer-executable program instructions stored in memory 112. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 112 comprises a computer-readable media that stores instructions, which when executed by processor 110, cause processor 110 to perform various steps, such as those described herein. Embodiments of computer-readable media may comprise, but are not limited to, an electronic, optical, magnetic, or other storage or transmission devices capable of providing processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures, and may be dispersed throughout one or more structures.

Processor 110 is in communication with a network interface 114. Network interface 114 may comprise one or more methods of mobile communication, such as infrared, radio, Wi-Fi or cellular network communication. In other variations, network interface 114 comprises a wired network interface, such as Ethernet. The mobile device 102 is configured to exchange data with other devices (not shown in FIG. 1) over networks such as a cellular network and/or the Internet. Embodiments of data exchanged between devices may comprise voice messages, text messages, data messages, or other forms of messages.

In the embodiment shown in FIG. 1, the processor 110 is also in communication with display 116. Display 116 is configured to display output from the processor 110 to the user. In some embodiments, processor 110 is configured to generate a signal, which is associated with a graphical representation of a user interface shown on display 116. Display 116 may comprise many different types of components. For example, in one embodiment, mobile device 102 comprises a liquid crystal display (LCD). In some embodiments, display 116 comprises a touch-screen. In some embodiments, the display and the touch-screen comprise a single, integrated component such as a touch-screen LCD.

In some embodiments, display 116 further comprises a touch-screen configured to detect a user interaction and transmit signals corresponding to that user interaction to processor 110. Processor 110 then uses the received signals to modify the graphical user interface displayed on display 116. Thus, a user may interact with virtual objects on display 116. For example, display 116 may comprise a virtual keyboard. When the user interacts with the keys of the virtual keyboard, the touch-screen transmits signals corresponding to that interaction to processor 110. Based on these signals, processor 110 may determine that the user depressed certain keys on the virtual keyboard. As one example, a user may use this functionality to enter a text message or other text document. In other embodiments, the touch-screen may enable the user to interact with other virtual objects such as stereo controls, map functions, virtual message objects, or other types of graphical user interfaces. Thus, a touch-screen in combination with display 116 gives users the ability to interact directly with the contents of the graphical user interface.

In some embodiments, not shown in FIG. 1, the display may comprise a reflective surface. In such an embodiment, the processor 110 is communicatively connected to a projector, which projects an image onto the display. In such an embodiment, the reflective surface may comprise, for example, a projector screen, a floor, a wall, a sporting field, or a human body. In such an embodiment, the reflective surface further comprises surface features. For example, a projector screen may comprise a surface feature in the form of a fold. In another example, a brick wall may comprise surface features formed by seams between the bricks. In other embodiments, the reflective surface may be a building, a desk, a table surface or some other reflective surface.

Display 116 comprises surface features 117 covering at least a portion of its surface. Surface features 117 are formed by raising or lowering sections of the surface of display 116. These raised or lowered portions form ridges and troughs that the user feels when interacting with display 116. The ridges and troughs may form shapes that the user recognizes. For example, in one embodiment, the surface features may take the form of letters and numbers arranged in a QWERTY keyboard configuration. In other embodiments, the surface features may form other shapes, for example, a grid or a swirl.

In some embodiments, surface features 117 may be permanently applied to the surface of display 116. In other embodiments, the user applies a removable skin to the surface of display 116, the removable skin comprising surface features 117. In such an embodiment, the user may remove the skin and replace it with a different skin comprising different surface features. Thus, the user may apply different surface features for different applications. Mobile device 102 may further comprise a data store, which comprises data regarding the location of surface features 117 on display 116. In some embodiments, the data store is a portion of memory 122. Processor 110 may use the information in the data store to modify the graphical user interface displayed on display 116. For example, processor 110 may display a virtual keyboard corresponding to a skin comprising surface features in the form of a keyboard.

When the user applies a new skin with different surface features 117, the user may update the data store to reflect the change in the surface features 117. In one embodiment, the user may update the data store manually using one the inputs of mobile device 102. In other embodiments, processor 110 may use network interface 114 to download information about the surface features. In still other embodiments, mobile device 102 may comprise a sensor, which detects when the user applies a new skin to the surface of touch-screen display 116. In such an embodiment, the skin comprises a unique identifier that matches its surface features. For example, a skin may comprise surface features in the form of a QWERTY keyboard, and further comprise a unique identifier corresponding to a QWERTY keyboard. When the user places the skin over the surface of touch-screen display 116, a sensor detects the unique identifier, and transmits a signal corresponding to that unique identifier to processor 110. The unique identifier may be for example, a magnetic identifier, a bar code, an RFID tag, or another sensor readable identifier. In other embodiments, the unique identifier may be a number, which the user reads and then manually enters into the mobile device.

Once processor 110 receives a signal corresponding to the skin's unique identifier, processor 110 may access the data store to determine a location of the surface feature on the display. For example, when processor 110 receives an indication that the user placed a skin comprising surface features in the form of a QWERTY keyboard over display 116, processor 110 may access the data store to determine the location of the surface features. In other embodiments, processor 110 may receive a signal from a sensor configured to detect the location of the surface features on the surface of the display. For example, processor 110 may be communicatively connected to a camera or other optical sensor, which captures an image of the display and transmits a corresponding signal to processor 110. Based on this signal, processor 110 may determine the location of surface features 117 on display 116.

In another embodiment, the display 116 may comprise dynamic surface features. In such an embodiment, processor 110 controls the operation of a haptic substrate mounted underneath the surface of display 116. In such an embodiment, display 116 is made of a flexible material, and in response to signals received from processor 110, the haptic substrate flexes, forming ridges, troughs, or other features on the surface of display 116. In some embodiments, the haptic substrate may comprise a plasma actuator, a piezoelectric actuator, an electro-active polymer, a Micro-Electro-Mechanical System, a shape memory alloy, a grid of fluid or gas-filled cells. Additional embodiments and applications for haptic substrates that implement dynamic surface features are discussed in U.S. patent application Ser. No. 12/353,516, filed Oct. 17, 2008, U.S. patent application Ser. No. 11/943,862, filed Nov. 21, 2007, and U.S. Patent Application No. 61/176,431, filed May 7, 2009, the entirety of all of which is hereby incorporated by reference.

Processor 110 is configured to receive a display signal comprising graphical data. In some embodiments, the graphical data may comprise a user interface. In some embodiments the graphical data may correspond to the surface features 117. In other embodiments, the graphical data may correspond to an image unrelated to the surface features.

Processor 110 is further configured to transform the display signal, based at least in part on the location of surface features 117. For example, in one embodiment processor 110 may transform the display signal to modify brightness, hue, contrast, resolution, saturation, sharpness or image warping. In other embodiments, processor 110 may stretch, compress, or otherwise modify the image itself. In some embodiments, processor 110 may transform the entire display signal. In other embodiments, processor 110 may transform only the portion of the display signal that corresponds to the location of the surface features. For example, in one embodiment, the display signal may comprise data that corresponds to an image of a flower. In such an embodiment, display 116 may comprise a skin comprising surface features in the form of a QWERTY keyboard. In such an embodiment, the processor may transform the display signal to adjust the brightness, hue, contrast, saturation, sharpness, or image warping of the portions of the display signal that will be obstructed by the QWERTY keyboard. This transformation may serve to minimize the distortion caused by the surface features 117.

In some embodiments, the mobile device 102 may comprise a sensor (not shown in FIG. 1) configured to detect the user's viewing angle. This sensor may transmit a signal comprising a measurement of the user's viewing angle to processor 110. Based at least in part on this signal, processor 110 may further transform the video signal to reduce distortion caused by the user's viewing angle. This distortion may be the result of convex or concave portions of the display magnifying or otherwise altering the user's view of the display. In some embodiments, for example, the additional sensor may comprise an eye tracking sensor. In such an embodiment, the eye-tracking sensor may transmit a signal to the processor 110 indicating that the user's view of the display is tilted at a 45-degree angle. Based at least on part on this signal, processor 110 may transform the video signal to compensate for additional distortion caused by the user's viewing angle. In other embodiments, the sensor may comprise cameras, infrared, ultrasound sensors, gyroscopes, or accelerometers configured to track the direction that the user's head is facing relative to the display. In such embodiments, the processor may use the derived viewing angle to further compensate for visual distortion.

In some embodiments, upon receipt of the unique identifier, processor 110 may determine to output a user interface that corresponds to the surface features 117. For example, in one embodiment, a user may apply a skin comprising surface features that form a QWERTY keyboard, for use when entering a text message. In another embodiment, the user may apply a skin comprising surface features in the form of stereo controls for use with a music player application. In another embodiment, the user may apply a skin comprising surface features in the form of numbers and mathematical symbols for use with the mobile device's calculator function. In an embodiment wherein the mobile device includes the capability of generating dynamic surface features, when processor 110 transmits a signal to change the image on display 116, processor 110 may also transmit a signal to a haptic substrate. In response, the haptic substrate may generate dynamic surface features on the display surface that correspond to the displayed image. For example, if display 116 comprises an image of a calculator, the dynamic surface features may take the shape of a numeric keypad. In another example, if display 116 comprises a virtual QWERTY keyboard, the dynamic surface features may take the shape of a virtual QWERTY keyboard.

In some embodiments, mobile device 102 may comprise a mode of input, such as a track ball, buttons, keys, a scroll wheel, and/or a joystick (not shown in FIG. 1). These additional forms of input may be used to interact with the graphical user interface displayed on display 116.

As shown in FIG. 1, processor 110 is also in communication with one or more actuators 118. Processor 110 is configured to determine a haptic effect, and transmit a corresponding haptic signal to actuator 118. Actuator 118 is configured to receive the haptic signal from the processor 110 and generate a haptic effect. Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA).

Figure 2:
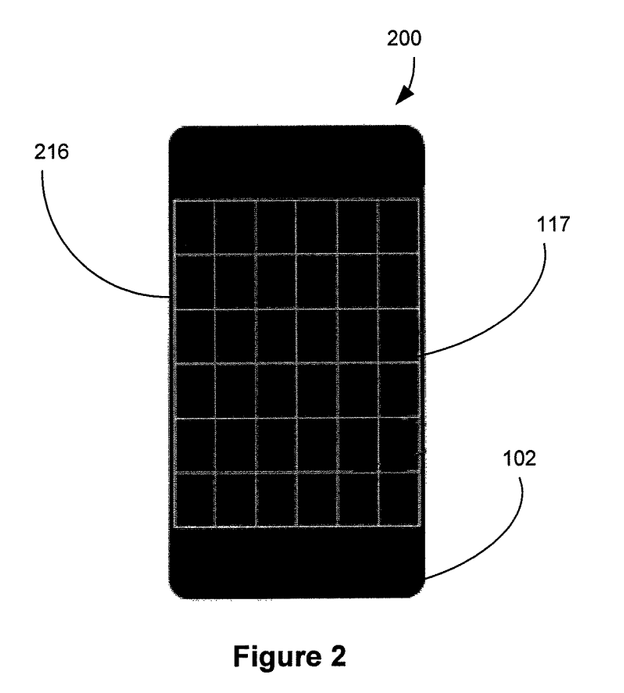
FIG. 2 is an illustrative embodiment of a system for compensating for visual distortion caused by surface features on a display according to one embodiment of the present invention.

FIG. 2 is an illustrative embodiment of a system for compensating for visual distortion caused by surface features on a display according to one embodiment of the present invention. The elements of system 200 are described with reference to the system depicted in FIG. 1, but a variety of other implementations are possible.

As shown in FIG. 2, system 200 comprises a mobile device 102, such as a mobile phone, portable digital assistant (PDA), portable media player, or portable gaming device. Mobile device 102 may include a wireless network interface and/or a wired network interface 114 (not shown in FIG. 2). Mobile device 102 may use this network interface to send and receive signals comprising voice-mail, text messages, and other data messages over a network such as a cellular network, intranet, or the Internet. Although FIG. 2 illustrates device 102 as a handheld mobile device, other embodiments may use other devices, such as video game systems and/or personal computers.

As shown in FIG. 2, mobile device 102 comprises a touch-screen display 216. In addition to touch-screen display 216, the mobile device 102 may comprise buttons, a touchpad, a scroll wheel, a rocker switch, a joystick, or other forms of input (not shown in FIG. 2). Touch-screen display 216 is configured to receive signals from the processor 110 and output an image based upon those signals. In some embodiments, the image displayed by touch-screen display 216 comprises a graphical user interface.

Touch-screen display 216 is further configured to detect user interaction and transmit signals corresponding to that interaction to processor 110. Processor 110 may then manipulate the image displayed on touch-screen display 216 in a way that corresponds to the user interaction. Thus, a user may interact with virtual objects displayed on touch-screen display 216. For example, touch-screen display 216 may comprise a virtual keyboard. Then, when the user interacts with the keys of the virtual keyboard, touch-screen display 216 transmits signals corresponding to that interaction to processor 110. Based on this signal, processor 110 will determine that the user depressed certain keys on the virtual keyboard. A user may use such an embodiment, for example, to enter a text message or other text document. In other embodiments, touch-screen display 216 may enable the user to interact with other virtual objects such as stereo controls, map functions, virtual message objects, or other types of virtual user interfaces.

Touch-screen display 216 comprises surface features 117. These surface features are formed by raising or lowering sections of touch-screen display 216. These raised or lowered sections form troughs and ridges that the user can feel on the ordinarily flat surface of touch-screen display 216. In the embodiment shown in FIG. 2, surface features 117 form a grid overlaying touch-screen display 216. In other embodiments, the surface features may form a QWERTY keyboard, stereo controls, the numbers and symbols of a calculator, or some other pattern.

In some embodiments, the troughs and ridges may be formed at the time touch-screen display 216 is manufactured. In such an embodiment, surface features 117 are permanent. In other embodiments, the user installs a skin comprising troughs or ridges over the surface of touch-screen display 216. In such an embodiment, the user may change the surface features on touch-screen display 216 by changing the skin. Thus, the user may have multiple skins comprising different surface features for different applications. For example, a user may apply a skin comprising surface features that form a QWERTY keyboard for a text messaging application. Then, when the user wishes to use the mobile device as a portable music player, the user may apply a skin comprising surface features in the form of stereo controls. In some embodiments, the surface features are the result of a haptic substrate that is controlled by processor 110 to generate dynamic surface features on display 216. In such an embodiment, processor 110 can control the surface features to correspond to the display signal. For example, in one embodiment, processor 110 may transmit a display signal that generates a graphical user interface comprising stereo controls on display 216. In such an embodiment, processor 110 may further transmit a signal to a haptic substrate that causes the haptic substrate to generate dynamic surface features on display 216.

Figure 3A:
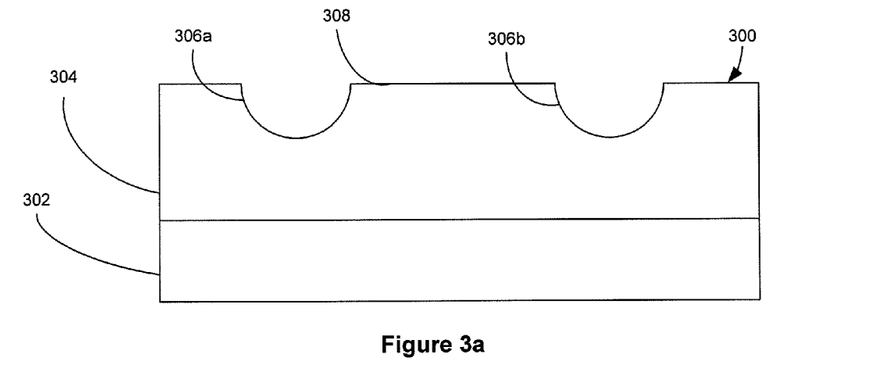
FIGS. 3a and 3b are cross-section illustrations of a system for compensating for visual distortion caused by surface features on a display according to one embodiment of the present invention.
Figure 3B:
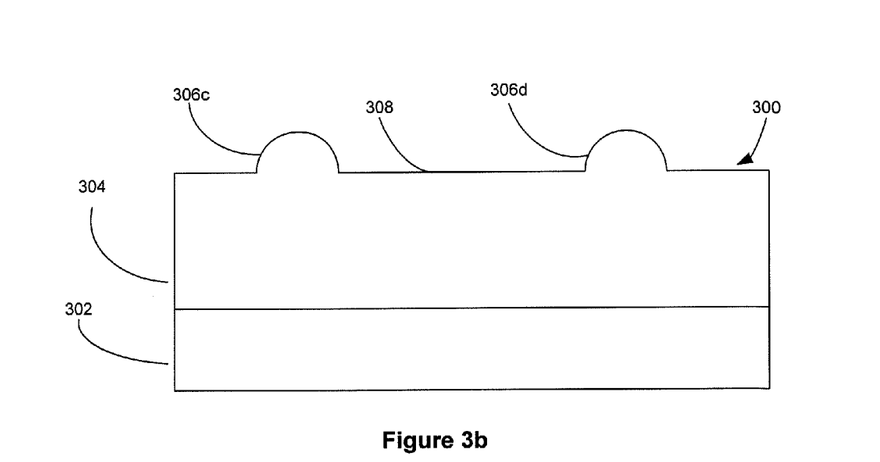

FIGS. 3a and 3b are cross-section illustrations of a system for compensating for visual distortion caused by surface features on a display according to one embodiment of the present invention. The embodiments shown in FIGS. 3a and 3b comprise a cross section view of a mobile device 300. Mobile device 300 comprises an LCD display 302. Resting on top of the LCD display 302 is a touch-screen 304. In other embodiments, the LCD display 302 and touch-screen 304 may comprise a single integrated component, such as a touch-screen LCD display.

The touch-screen 304 comprises an ordinarily flat surface 308. Surface features 306 cover at least a portion of touch-screen 304. In one embodiment shown in FIG. 3a, surface features are formed by troughs 306a and 306b. In another embodiment shown in FIG. 3b, the surface features are formed by ridges 306c and 306d. In other embodiments, the surface features may include a combination of ridges and troughs (not shown). In still other embodiments, a curvature of the display itself may form the surface features.

When the user drags a finger across touch-screen 308, the surface features 306 provide the user with indications of their finger's location. In some embodiments, the surface features 306 may form letters or numbers. These letters or numbers may be arranged in a QWERTY keyboard configuration or in the configuration of a calculator. In other embodiments, the surface features 306 may form a grid, web, or spiral configuration.

Figure 4:
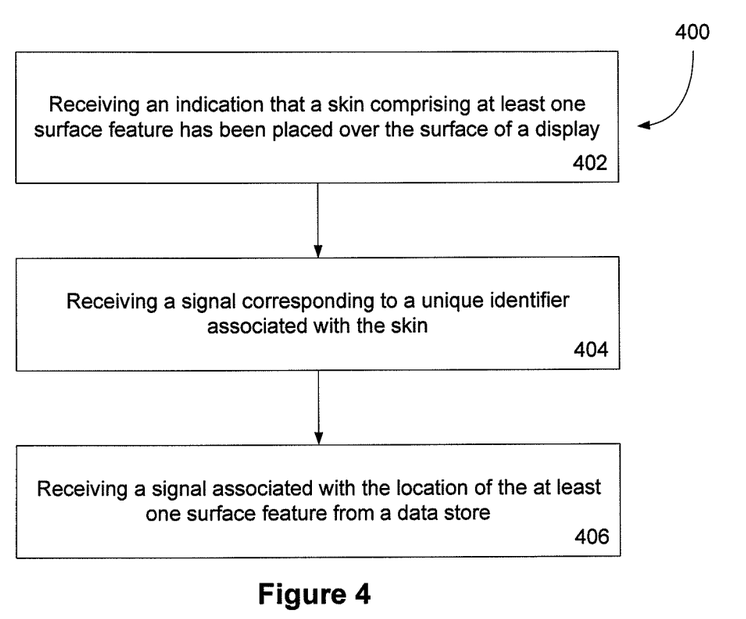
FIG. 4 is a flow diagram illustrating a method for determining the location of surface features on a display according to one embodiment of the present invention.

Illustrative Methods for Compensating for Distortion Caused by Surface Features on a Display FIG. 4 is a flow diagram illustrating a method for determining the location of surface features on a display according to one embodiment of the present invention.

The method 400 begins when processor 110 receives an indication that a skin comprising at least one surface feature 117 has been placed over the surface of display 116, 402. In some embodiments, display 116 further comprises a touch-screen and the processor 110 receives the indication from the touch-screen display 116. For example, the touch-screen may detect the skin and transmit a corresponding signal to processor 110. In another embodiment, the user may enter the indication via the touch-screen. In other embodiments, the mobile device may comprise another sensor, which detects that the user placed a skin over the surface of display 116. This sensor may be, for example, one or more of a bar code reader, a camera sensor, an RFID reader, an electromagnetic reader, or some other sensor.

The surface features may form shapes, which the user may recognize. For example, in one embodiment, the surface features may take the form of letters and numbers organized in a QWERTY keyboard configuration. In other embodiments, the surface features may form a grid, swirl, or some other pattern. The user may remove and replace the skin with a new skin comprising different surface features. Thus, the user has the option of placing different surface features on the surface of display 116 for different applications.

Next, processor 110 receives a signal corresponding to a unique identifier associated with the skin 404. In some embodiments, the unique identifier may be a number on the skin. In such an embodiment, the user may manually enter the number via a touch-screen, which transmits a signal associated with the unique identifier to processor 110. In other embodiments, the mobile device may comprise a sensor, which detects the unique identifier associated with the skin. For example, in one embodiment the skin may comprise a bar code, an RFID, or a magnetic ID. In such an embodiment, the mobile device comprises a sensor, which detects the unique identifier and transmits a corresponding signal to processor 110. In other embodiments, display 116 may automatically detect the surface features on the skin, and transmit a corresponding signal to processor 110. In other embodiments, the processor 110 receives information identifying the type and location of surface features. For example, a user may enter the size and shape of a surface on which a display is to be projected, such as the diameter and height of a column or the size of a wall and the layout of bricks on the wall.

The process continues when processor 110 receives a signal associated with the location of the surface feature 406. In some embodiments, the processor may receive the location from a data store. In such an embodiment, the data store may be a local data store associated with memory 112. In other embodiments, the data store may be a remote data store that is accessed via network interface 114. In such an embodiment, the processor 110 transmits a signal associated with the unique identifier to the remote data store via network interface 114. Then, the remote data store transmits a signal associated with the surface features back to network interface 114, which transmits the signal to processor 110. In another embodiment, the mobile device may comprise a haptic substrate configured to generate dynamic surface features on display 116. In such an embodiment, processor 110 transmits a signal to the haptic substrate, the signal configured to cause the haptic substrate to generate dynamic surface features at specific locations on display 116. In such an embodiment, determining the location of the surface features comprises using the same location as the location of the dynamic surface features generated by processor 110.

Figure 5:
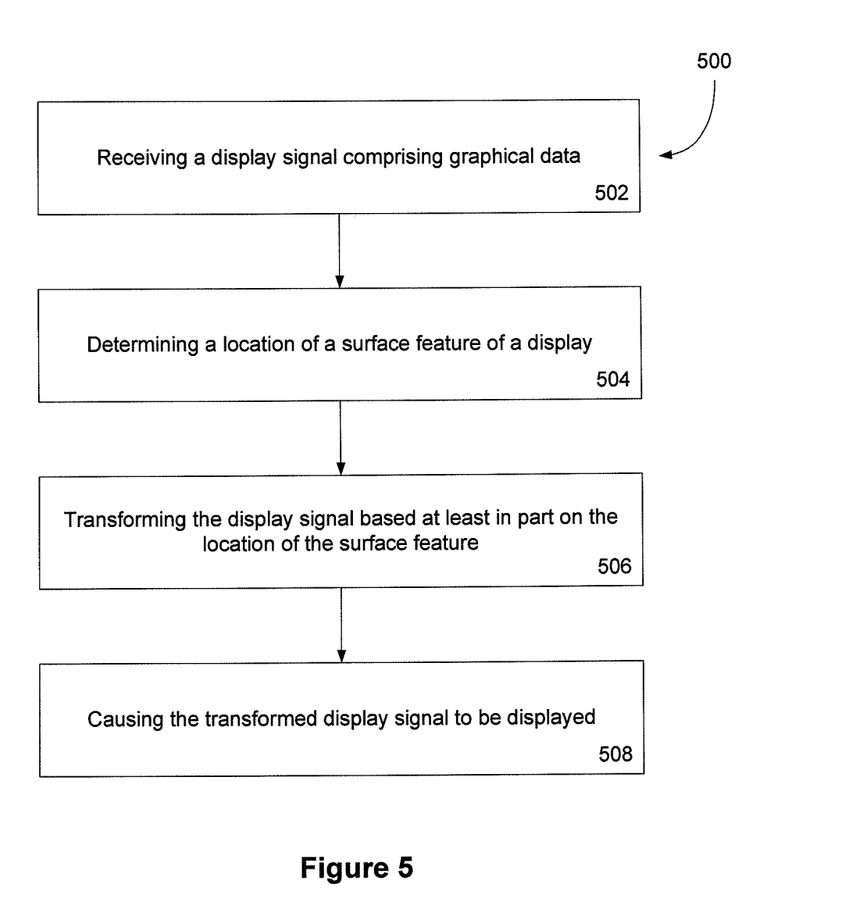
FIG. 5 is a flow diagram illustrating a method for compensating for visual distortion caused by surface features on a display according to one embodiment of the present invention.

FIG. 5 is a flow diagram illustrating a method for compensating for visual distortion caused by surface features on a display according to one embodiment of the present invention.

The method 500 begins when processor 110 receives a display signal comprising graphical data 502. In some embodiments, the graphical data may comprise a plurality of pixels, that when combined, form an image. In some embodiments, the display signal may comprise a graphical user interface. In other embodiments, the display signal may comprise a user defined image.

Next, at 504, the processor 110 determines a location of a surface feature of a display 116. In some embodiments, a skin placed over the surface of the display 116 may comprise the surface feature. In such an embodiment, the processor may determine the location of the surface feature using the method referenced in the discussion of FIG. 4.

In other embodiments, the surface feature may be permanently applied to the surface of the display 116. For example, in some embodiments, the surface feature may comprise a raised or grooved portion installed during the manufacture of the display 116. In another example, a permanent surface feature may comprise a scratch on the surface of the display 116, formed when the user dropped the device. In still other embodiments, the display may comprise a reflective surface on which a projector outputs an image. In such an embodiment, the reflective surface may comprise a surface which is ordinarily curved or non-uniform. For example, such a surface may comprise a brick wall, a floor, a stairway, a sporting field, a building, a desk, a table surface, or a human body. In such embodiments, the processor 110 may receive a sensor signal from a sensor configured to detect the location of surface features. For example, in one embodiment, the sensor may comprise a camera or other optical sensor. In such an embodiment, the sensor may transmit a signal corresponding to the locations of surface features to processor 110. Based at least in part on this signal, processor 110 may determine the location of surface features on the display. For example, in one embodiment the reflective surface may comprise a bench on a sidewalk. In such an embodiment, an optical sensor may transmit a sensor signal to the processor 110. The sensor signal may comprise data that the processor uses to determine the location of surface features on the bench. For example, the processor may determine the location of bolts and posts. In some embodiments, the surface features may be dynamic. For example, in such an embodiment, the processor may transmit a signal to a haptic substrate configured to generate a surface feature on the surface of the display. In such an embodiment, determining the location of the surface feature may comprise using the same location as the processor used to generate the dynamic surface feature. In some embodiment, the surface features may move on the surface of the display. In such an embodiment, the processor may be further configured to determine the location of the surface features as they move.

Then, at 506, processor 110 transforms the display signal based at least in part on the location of the surface features 117. For example, in one embodiment, processor 110 may transform the display signal to modify brightness, hue, contrast, saturation, sharpness, or image warping. In some embodiments, processor 110 may transform the entire display signal. In other embodiments, processor 110 may transform only the portion of the display signal that corresponds to the location of the surface features 117. For example, in one embodiment, the display signal may comprise data that corresponds to an image of a flower. In such an embodiment, display 116 may comprise a skin comprising surface features 117 in the form of a QWERTY keyboard. In such an embodiment, the processor may transform the display signal to adjust the brightness, hue, saturation, contrast, sharpness, or image warping of the portions of the display signal that the QWERTY keyboard will distort. This transformation may serve to minimize the distortion caused by the surface features 117. In another embodiment, the display may comprise a reflective surface, for example, a bench on a sidewalk. In such an embodiment, the display signal may correspond to an image of a flower. In such an embodiment, processor 110 may transform the display signal to adjust the brightness, hue, saturation, contrast, or sharpness on the portions of the display signal that the bench will distort. For example, the processor may transform the portions of the signal that are displayed on the bench's bolts and posts. Thus, when a projector outputs the image, the bolts and posts may not significantly distort the flower.

In an embodiment wherein the display comprises a reflective surface, the reflective surface may further comprise surface features that are more or less reflective than the rest of the surface. For example, in one embodiment, the reflective surface may be a bench on a sidewalk. The bench may comprise bolts that are very reflective, and posts that are less reflective. In such an embodiment, the processor 110 may determine that the brightness of the display signal should be reduced in the areas that correspond to the location of the bolts. The processor may further determine that the brightness of the display signal should be increased at the areas that correspond to the location of the posts. In other embodiments, the processor may further determine to increase or decrease the contrast, hue, or sharpness of the portions of the display signal that correspond to the location of surface features. In other embodiments, the surface features on the surface of the display may have characteristics that further distort the displayed image, for example, the surface may be curved, or covered by a shadow. In such embodiments, the processor 110 may determine modifications to the display signal to compensate for the distortion, for example, the processor 110 may increase or decrease contrast, hue, sharpness, brightness, resolution, image warping, saturation, or other signal characteristics. In other embodiments, processor 110 may stretch, compress, or otherwise modify the image itself.

In some embodiments, the surface features may move across the surface of the display. For example, in an embodiment wherein the display surface comprises a reflective surface, the reflective surface may shift in the wind. In such an embodiment, processor 110 may be configured to compensate for the moving portions of the display. In another embodiment, the processor may transmit a signal to a haptic substrate that is configured to generate surface features on display 116. In such an embodiment, the signal may be configured to cause the surface features to move across the surface of display 116. In such an embodiment, the processor may be configured modify characteristics of the video signal to compensate for the movement of the surface features.

Finally, processor 110 causes the display signal to be displayed 508. In some embodiments, processor 110 may transmit the transformed display signal to a display. In some embodiments, the display may comprise an LCD display or a CRT display. In other embodiments, the display may comprise a reflective surface, and the processor may output the display signal to a projector, which projects the display signal onto the reflective surface. In such an embodiment, the reflective surface may comprise, for example, a floor, a wall, a sporting field, a bench, or a person.

Figure 6A:
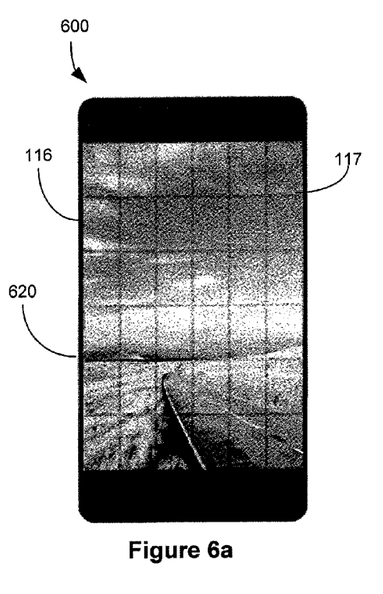
FIGS. 6a and 6b are illustrations of a system for compensating for visual distortion caused by surface features on a display according to one embodiment of the present invention.
Figure 6B:
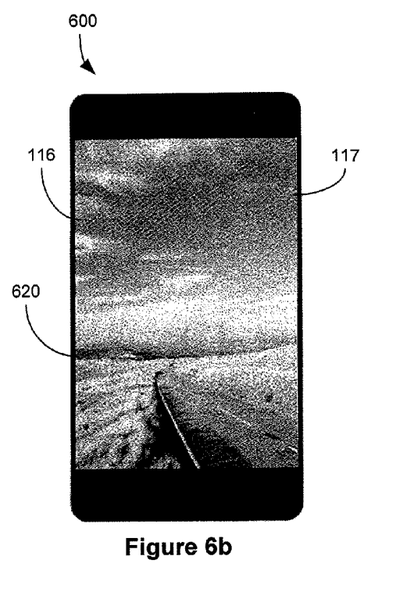

Illustrative System for Compensating for Distortion Caused by Surface Features on a Display FIGS. 6a and 6b are illustrations of a system for compensating for visual distortion caused by surface features on a display according to one embodiment of the present invention. The embodiments shown in FIGS. 6a and 6b comprise a mobile device 600. The mobile device 600 comprises a display 116. The display 116 further comprises an image of a country road 620. The surface of display 116 further comprises surface features 117. In the embodiment shown in FIGS. 6a and 6b, surface features 117 form a grid pattern on the surface of display 116. In one embodiment, grooves cut into the surface of display 116 may form surface features 117. In other embodiments, the user may place a skin comprising surface features 117 over the surface of display 116. In such an embodiment, the user may remove the skin and replace it with a new skin comprising different surface features. In still other embodiments, the surface features may be dynamic surface features formed by a haptic substrate configured to receive a signal from processor 110, and in response generate a dynamic surface feature on display 116.

In the embodiment shown in FIG. 6a, mobile device 600 has not activated a system or method for compensating for distortion caused by surface features on a display. Thus, the video signal is output without any transformation to compensate for distortion caused by surface features 117. As shown in FIG. 4a, surface features 117 distort the image 420 displayed by display 116.

The embodiment shown in FIG. 6a utilizes a system for compensating for distortion caused by surface features on a display. In the embodiment shown in FIG. 6b, processor 110 received a display signal comprising graphical data. In some embodiments, the graphical data may comprise data associated with a plurality of pixels. In the embodiment shown in FIGS. 6a and 6b, the plurality of pixels form the image 620. Further, processor 110 determined a location of the surface features 117 on display 116. And based at least in part on the determination of the location of surface features 117, processor 110 transformed the pixels of the display signal. For example, in the embodiment shown, processor 6b may have adjusted the brightness, contrast, hue, contrast, resolution, or sharpness of the pixels that are located in the areas of display 116 corresponding to surface features 117. In other embodiments, processor 110 may stretch, compress, or otherwise modify the image itself. Then processor 110 caused the transformed display signal to be displayed. As shown in FIG. 6b, surface features 117 still cause some distortion on display 116. However, the transformation reduced this distortion, thus allowing display 116 to display image 620 more clearly.

Advantages of Compensating for Distortion Caused by Surface Features on a Display Embodiments of systems and methods for compensating for distortion caused by surface features on a display provide various advantages over current systems. A display that includes some form of surface feature may provide the user with tactile feedback, which makes the device more intuitive, accessible, and/or usable. However, the surface features may distort the image on the display. If the device compensates for this distortion, then the image will appear clearer to the user. Thus, the user will benefit from the advantages of surface features, without losing the visual clarity found on a flat display surface. This will lead to user satisfaction and more widespread use of the device.

Embodiments of the present invention can be implemented in digital electronic circuitry, or in computer hardware, firmware, software, or in combinations of them. In one embodiment, a computer may comprise a processor or processors. The processor comprises a computer-readable medium, such as a random access memory (RAM) coupled to the processor. The processor executes computer-executable program instructions stored in memory, such as executing one or more computer programs for messaging. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise or be in communication with media, for example computer-readable media, that may store instructions that, when executed by the processor, can cause the processor to perform the steps described herein as carried out or assisted by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor and the processing described may be in one or more structures, and may be dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A system, comprising:
a display comprising a surface feature, wherein the display comprises a touch-screen;
a processor configured to:
receive a display signal;
determine a location of the surface feature on the display, wherein determining the location of the surface feature on the display comprises:
receiving an indication that a skin comprising at least one surface feature has been placed over a surface of the display;
receiving a signal corresponding to a unique identifier associated with the skin; and
receiving a signal associated with the location of the at least one surface feature from a data store;
transform the display signal based at least in part on the location of the surface feature; and
transmit the transformed display signal to the display.

2. The system of claim 1, wherein the surface feature comprises: a trough, a ridge, or a curvature.

3. The system of claim 1, wherein transforming the display signal comprises adjusting one or more of: brightness, hue, contrast, resolution, saturation, image warping, and sharpness.

4. The system of claim 1, wherein the display signal comprises data associated with a plurality of pixels.

5. The system of claim 4, wherein transforming the display signal comprises transforming pixels that correspond to the location of the surface feature.

6. A method comprising:
receiving a display signal;
determining a location of a surface feature of a touch-screen display, wherein determining the location of the surface feature on the touch-screen display comprises:
receiving an indication that a skin comprising at least one surface feature has been placed over a surface of the touch-screen display;
receiving a signal from a sensor configured to detect a unique identifier associated with the skin; and
receiving a signal associated with the location of the at least one surface feature from a data store;
transforming the display signal based at least in part on the location of the surface feature; and
transmitting the transformed display signal to the touch-screen display.

7. A method comprising:
receiving a display signal;
determining a location of a surface feature of a display, wherein determining the location of the surface feature on the display comprises:
receiving an indication that a skin comprising at least one surface feature has been placed over a surface of the display;
receiving a signal corresponding to a unique identifier associated with the skin; and
receiving a signal associated with the location of the at least one surface feature from a data store;
transforming the display signal based at least in part on the location of the surface feature; and
transmitting the transformed display signal to the display.

8. The method of claim 7, wherein the unique identifier comprises one or more of: a magnetic identifier, a bar code, or an RFID tag.

9. The method of claim 7, wherein generating a transformed display signal comprises adjusting one or more of: brightness, hue, contrast, resolution, saturation, image warping, and sharpness.

10. The method of claim 7, wherein the display signal comprises data associated with a plurality of pixels.

11. The method of claim 10, wherein transforming the display signal comprises transforming the pixels that correspond to the location of the surface feature.

12. A non-transitory computer-readable medium encoded with executable program code, the computer-readable medium comprising:
  program code to receive a display signal;
  program code to determine a location of a surface feature of a touch-screen display, wherein determining the location of the surface feature on the touch-screen display comprises:
    receiving an indication that a skin comprising at least one surface feature has been placed over a surface of the touch-screen display;
    receiving a signal corresponding to a unique identifier associated with the skin; and
    receiving a signal associated with the location of the at least one surface feature from a data store;
  program code to transform the display signal based at least in part on the location of the surface feature; and
  program code to transmit the transformed display signal to the touch-screen display.

* * * * *